(12) United States Patent
Chen et al.

(10) Patent No.: US 11,303,434 B2
(45) Date of Patent: Apr. 12, 2022

(54) TECHNIQUES FOR SECURE CHANNEL COMMUNICATIONS

(71) Applicant: Visa International Service Association, San Francisco, CA (US)

(72) Inventors: Yuexi Chen, Foster City, CA (US); Marc Kekicheff, Foster City, CA (US); Philippe Martin, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/980,279

(22) PCT Filed: Mar. 11, 2019

(86) PCT No.: PCT/US2019/021644
§ 371 (c)(1),
(2) Date: Sep. 11, 2020

(87) PCT Pub. No.: WO2019/177984
PCT Pub. Date: Sep. 19, 2019

(65) Prior Publication Data
US 2021/0006396 A1    Jan. 7, 2021

Related U.S. Application Data

(60) Provisional application No. 62/641,703, filed on Mar. 12, 2018.

(51) Int. Cl.
*H04L 9/08* (2006.01)
*H04L 29/06* (2006.01)
*H04L 67/141* (2022.01)

(52) U.S. Cl.
CPC ........ *H04L 9/0825* (2013.01); *H04L 63/0428* (2013.01); *H04L 63/061* (2013.01); *H04L 67/141* (2013.01); *H04L 2209/56* (2013.01)

(58) Field of Classification Search
CPC . H04L 9/0825; H04L 9/3247; H04L 63/0428; H04L 63/061; H04L 63/068;
(Continued)

(56) References Cited

U.S. PATENT DOCUMENTS

2004/0034772 A1*  2/2004  Alao ...................... H04L 9/302
                                                                  713/168
2005/0005259 A1*  1/2005  Avery .................... G06Q 10/10
                                                                  717/103
(Continued)

FOREIGN PATENT DOCUMENTS

KR         101246163         3/2013
WO        2015171916        11/2015

OTHER PUBLICATIONS

Application No. PCT/US2019/021644, International Search Report and Written Opinion, dated Jun. 20, 2019, 9 pages.
(Continued)

*Primary Examiner* — Alina A Boutah
(74) *Attorney, Agent, or Firm* — Kilpatrick Townsend & Stockton LLP

(57) ABSTRACT

A method for conducting a transaction is disclosed. A processor in a thin client may receive transaction data from a portable device of a first portable device type. The processor may determine that the portable device is the first portable device type. The processor may apply an encryption protocol associated with a second portable device type to the transaction data to create encrypted data. The processor may transmit the encrypted data to a remote computer, wherein the remote computer utilizes the encryption protocol to decrypt the transaction data, and thereafter process the transaction data to conduct the transaction.

18 Claims, 8 Drawing Sheets

(58) Field of Classification Search
CPC . H04L 63/0471; H04L 67/141; H04L 67/303; H04L 67/2823; H04L 2209/56; H04L 9/0841; G06Q 20/322; G06Q 20/3823; G06Q 20/382
See application file for complete search history.

(56) References Cited

U.S. PATENT DOCUMENTS

| | | |
|---|---|---|
| 2006/0224470 A1 | 10/2006 | Garcia Ruano et al. |
| 2007/0105544 A1 | 5/2007 | Veres et al. |
| 2007/0288320 A1* | 12/2007 | Cooper ............... G06Q 20/206 705/348 |
| 2008/0010203 A1 | 1/2008 | Grant |
| 2009/0070258 A1* | 3/2009 | Nguyen ............... G06Q 20/105 705/41 |
| 2009/0132690 A1* | 5/2009 | Hafez ............... G06Q 30/0603 709/223 |
| 2009/0150286 A1* | 6/2009 | Barton ............... G06Q 20/40 705/44 |
| 2011/0004526 A1* | 1/2011 | Hammad ............... G06Q 30/06 705/16 |
| 2012/0084544 A1* | 4/2012 | Farina ............... H04L 63/12 713/2 |
| 2012/0084562 A1* | 4/2012 | Farina ............... H04L 63/12 713/168 |
| 2012/0315846 A1* | 12/2012 | Gartner ............... H04B 5/02 455/41.1 |
| 2013/0212025 A1 | 8/2013 | Tanner et al. |
| 2013/0254110 A1* | 9/2013 | Royyuru ............... G06Q 20/36 705/44 |
| 2015/0249667 A1* | 9/2015 | Han ............... G07F 19/206 726/4 |
| 2015/0319161 A1* | 11/2015 | Dimmick ............... H04W 4/025 726/4 |
| 2015/0324800 A1* | 11/2015 | Kapur ............... G06Q 20/4012 705/72 |
| 2016/0226839 A1* | 8/2016 | Black ............... H04W 12/02 |
| 2016/0307195 A1* | 10/2016 | Cantwell ............... H04L 69/08 |
| 2016/0378707 A1* | 12/2016 | Sikand ............... B60L 50/00 713/189 |
| 2017/0046685 A1* | 2/2017 | Tatara ............... G06Q 20/209 |
| 2017/0103399 A1* | 4/2017 | Napsky ............... G06Q 30/0609 |
| 2018/0137480 A1* | 5/2018 | Houghton, IV ... G06Q 20/3276 |
| 2018/0376333 A1* | 12/2018 | Chen ............... H04W 4/80 |
| 2019/0164388 A1* | 5/2019 | Ozasa ............... G07F 19/21 |

OTHER PUBLICATIONS

"EMV 2nd Generation Acceptance System Specifications", POI System, Book13, Version 0.8.5, Nov. 22, 2017, 126 pages.
Application No. EP19766929.4, Extended European Search Report, dated Mar. 5, 2021, 10 pages.

\* cited by examiner

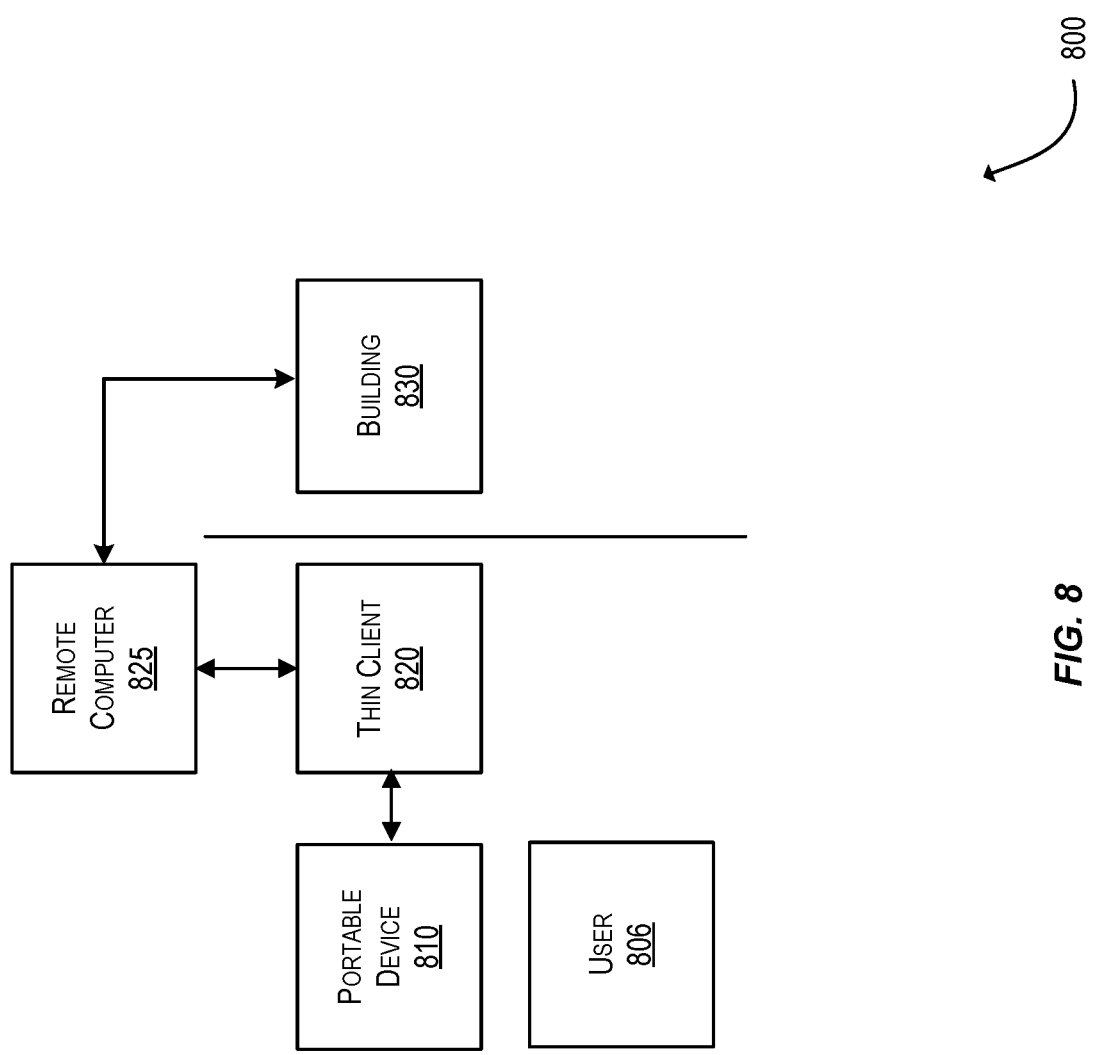

TECHNIQUES FOR SECURE CHANNEL COMMUNICATIONS

CROSS-REFERENCE TO RELATED APPLICATIONS

This application is a 371 National Phase of PCT Patent Application No. PCT/US2019/021644, filed Mar. 11, 2019, which claims priority to U.S. Provisional Patent Application No. 62/641,703, filed on Mar. 12, 2018, the disclosures of which are herein incorporated by reference in their entirety for all purposes.

BACKGROUND

Current systems and methods allow for portable devices of a first portable device type to communicate with access devices. Portable devices of a second device type are being developed and can have improved functionality and/or security. While it would be desirable to replace all portable devices of the first device type with portable devices of the second device type, this is difficult. For example, there more than 6 billion portable devices of the first portable device type, so it is not feasible to replace the portable devices of the first portable device type with portable devices of a second portable device type.

Embodiments of the invention address these and other problems individually and collectively.

BRIEF SUMMARY

One embodiment of the invention is directed to a method for conducting a transaction comprising: receiving, by a processor in a thin client from a first portable device of a first portable device type, transaction data; determining, by the processor, that the first portable device is the first portable device type; applying, the processor, an encryption protocol associated with a second portable device type to the transaction data to create encrypted data; transmitting, by the processor, the encrypted data to a remote computer, wherein the remote computer utilizes the encryption protocol to decrypt the access data, and thereafter process the transaction data to conduct the transaction.

Another embodiment of the invention is directed to a thin client programmed to perform the above-noted method.

Further details regarding embodiments of the invention can be found in the Detailed Description and the Figures.

BRIEF DESCRIPTION OF THE DRAWINGS

FIG. 8 shows a block diagram illustrating a building access system.

DETAILED DESCRIPTION

Figure 1:
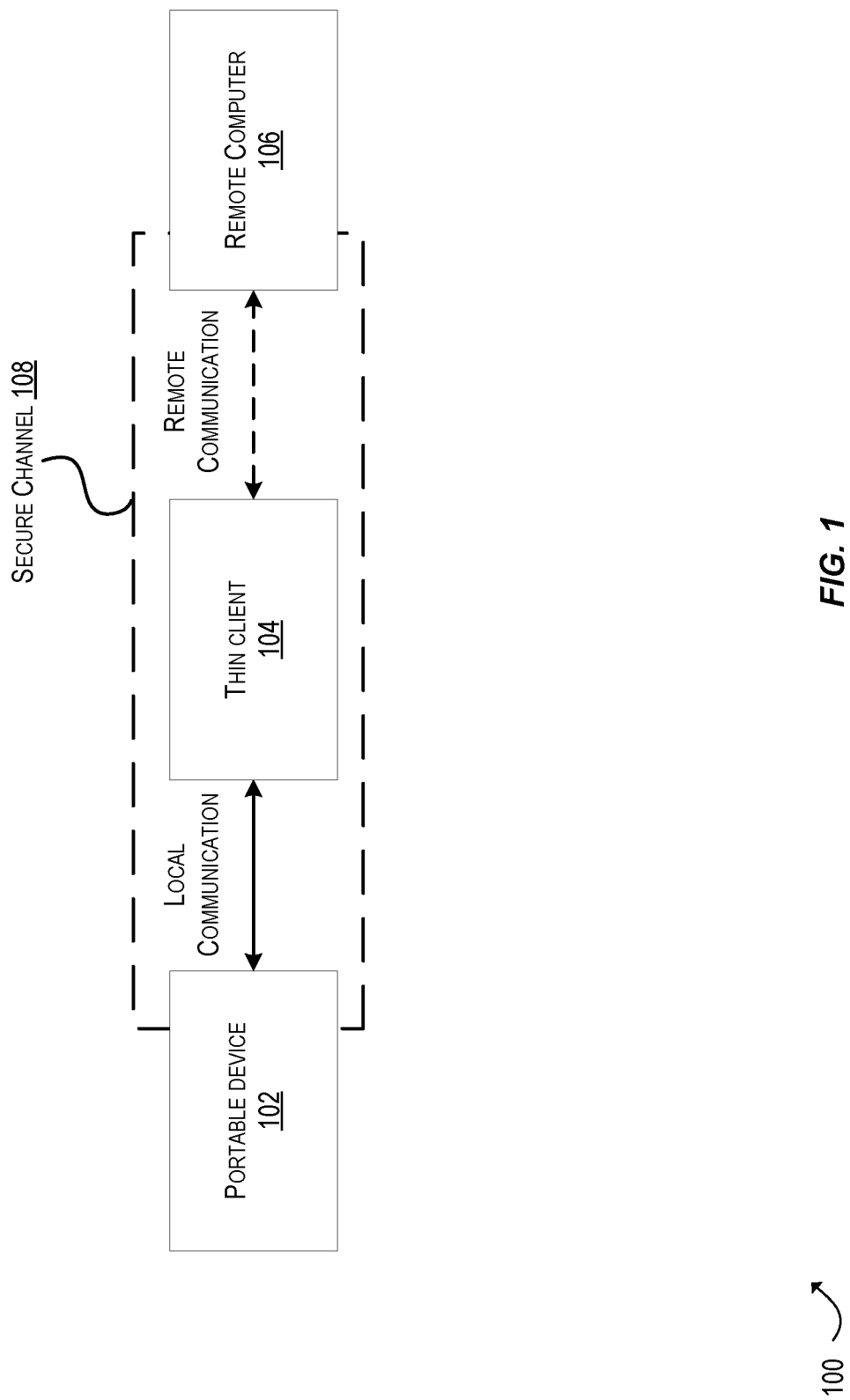
FIG. 1 shows a block diagram of a system according to at least one embodiment.

Prior to discussing embodiments of the invention, some terms can be described in further detail.

A "portable device" may comprise any suitable device that may be carried by a user. Examples of portable devices may include mobile communication devices (e.g., mobile phones), payment devices (e.g., credit cards, debit cards, etc.), user access devices such as access badges, etc. A portable device can store sensitive information such as payment credentials (e.g., primary account numbers, tokens, expiration dates, etc.), and access credentials.

A "payment device" may include any suitable device that may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction). Mobile communication devices may also include vehicles such as cars that have remote communication capabilities.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Transaction data" may include any suitable data utilized to conduct a transaction. By way of example, transaction data may include track 2 card data, payment credentials, tokens, payment tokens, any suitable data generated and/or provided by a remote computer configured to perform payment acceptance functionality, and/or the like.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a portable device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

A "remote computer" may include a device that is remote with respect to an access device (or thin client). In some embodiments, a remote computer may be a server computer configured to perform Point-of-Sale (POS) terminal functionality (EMV® technology) for transactions (e.g., payment transactions). A remote computer may also be referred to as a software defined point of sale (POS) and/or a "cloud POS".

A "thin client" may refer to a type of access device. A thin client may be configured to perform limited functionality to facilitate transactions between a portable device and a remote computer. A thin client may interface with a variety of devices/components such as a user interface (e.g., a display, a card reader, etc.), a portable device, and/or a verification entry device (e.g., a pin pad, a biometric reader, etc.). In some embodiments, the thin client maintains the processing flow context and coordinates the processing flow between the remote computer (e.g., the cloud POS) and the local interfaces such as user interface(s), the portable device, and/or the verification entry device(s). In some embodiments, the thin client may be capable of communicating using different communication protocols. When receiving, from a portable device, communications under a communication protocol that is incompatible with a remote computer, the thin client may convert the received communications to be compatible with the remote computer and forward the converted communications. Likewise, when receiving communications from the remote computer, the thin client may convert the communications to a communication protocol that is incompatible with the remote computer (e.g., a communications protocol associated with the portable device) before forwarding the converted communication to the portable device. Generally, a thin client may perform any suitable operations for facilitating data communications between a portable device and a remote computer. In some embodiments, the thin client may be configured to perform any suitable operations (e.g., authentication, session key generation, etc.) to establish a secure channel with another computing device (e.g., a remote computer) with which to exchange encrypted data.

A "secure channel" may refer to any suitable path for secure communication between two or more entities. A secure channel may be established by a secure channel protocol. In some embodiments, a secure channel protocol may be a mechanism that allows two entities or devices to authenticate each other and establish session keys in order to protect the integrity and confidentiality of subsequent communications. In some embodiments, data transmitted via the secure channel may be encrypted at one end of the channel and decrypted at the other end of the channel.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction data," such as any data associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments discussed herein are directed to improving security for transactions processed using portable devices (e.g., chip cards) that utilize a first protocol. The first protocol (e.g., EMV 1.0) may not include security enhancements provided in a second protocol (e.g., EMV 2.0). For example, utilizing the second protocol, a secure channel may be established between the portable device (e.g., the chip card) and the remote computer (e.g., the cloud POS) such that encrypted data communications may be securely exchanged between the two via a thin client. Embodiments herein improve the security for data exchanges conducted with portable devices that utilize the first protocol.

FIG. 1 shows a system 100 comprising a number of components according to an embodiment of the invention. The system 100 comprises a portable device 102, a thin client 104, a remote computer 106, and a secure channel 108. The portable device 102 and the thin client 104 may be in local communication (e.g., communicating via a local area network, Bluetooth®, Near Field Communications, Bluetooth LEO, direct contact between the portable device and a reader of the thin client, etc.). The thin client 104 and the remote computer 106 may be in remote communication (e.g., via the Internet or any suitable wide area network). The portable device 102, the thin client 104, and the remote computer 106 may communicate via the secure channel 108.

For simplicity of illustration, a certain number of components are shown in FIG. 1. It is understood, however, that embodiments of the invention may include more than one of each component.

The portable device 102 may be of a second portable device type. In some embodiments, the portable device 102 of the second portable device type may be a second generation EMV card. The portable device 102 of the second portable device type may be configured to communicate using a secure communication protocol such as the EMV 2.0 protocol.

The thin client 104 may exchange communications with the portable device 102. The thin client 104 may enable the portable device 102 to exchange transaction information with the remote computer 106 during a transaction. In some embodiments, the thin client 104 may forward data received from the portable device 102 to the remote computer 106. In some embodiments, the thin client 104 may be a type of access device operated by a resource provider (e.g., a merchant).

The remote computer 106 may be configured to communicate using the secure communication protocol (e.g., EMV 2.0). In some embodiments, the remote computer 106 (a cloud POS) may provide a payment acceptance service in the cloud.

The secure channel 108 may be established by the portable device 102, the thin client 104, and the remote computer 106. The secure channel 108 may be established as a result of a secure channel protocol. The secure channel protocol may be associated with portable devices of a second portable device type.

Figure 2A:
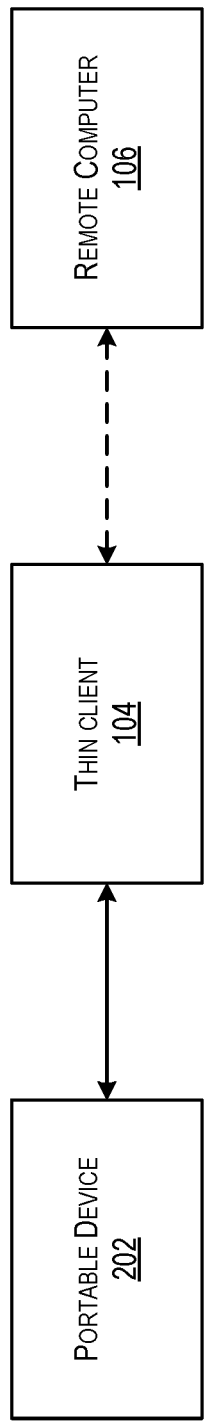
FIG. 2A shows a block diagram of an insecure system, according to at least one embodiment.

FIG. 2A shows an alternate system 200A according to an embodiment of the invention. The system in FIG. 2A comprises a portable device 202 of a first portable device type, a thin client 104, and a remote computer 106.

The portable device 202 of the first portable device type may be configured to communicate with a first communications protocol (e.g., EMV 1.0). In some embodiments, the portable device 202 may be unable to communicate using the secure communication protocol associated with portable devices of a second portable device type. In this case, when the portable device 202 interacts with the thin client 104, there is no secure channel. Additionally, there is no secure channel between the thin client 104 and the remote computer 106. In some embodiments, the portable device 202 of the first portable device type may be a first generation EMV card configured to communicate with a first communications protocol (e.g., EMV 1.0).

Figure 2B:
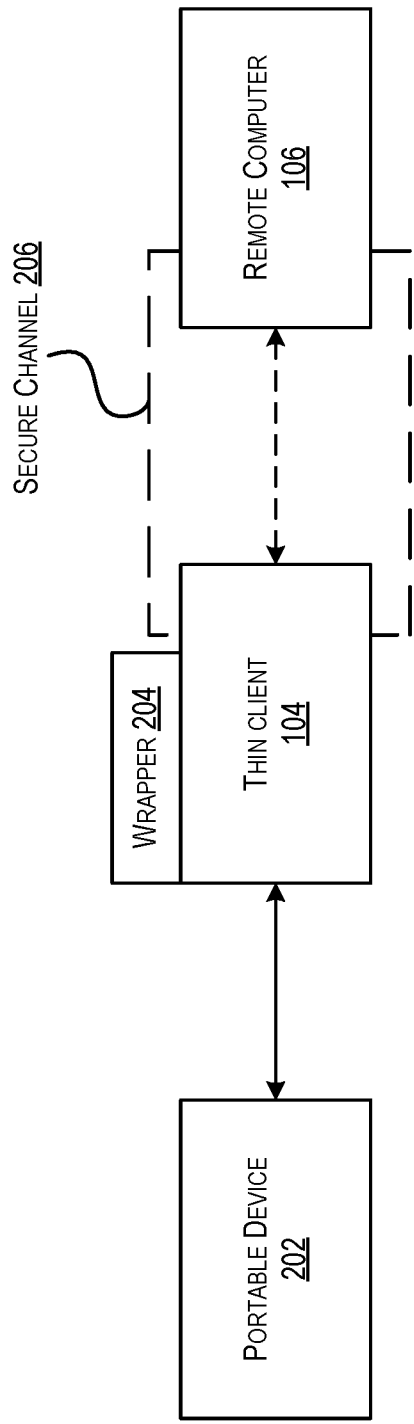
FIG. 2B shows a block diagram of a secure system, according to at least one embodiment.

FIG. 2B shows an alternate system 200B according to an embodiment of the invention. The system in FIG. 2B comprises the portable device 202 of a first portable device type (the portable device 202 of FIG. 2A), a thin client 104 including a wrapper 204, a remote computer 106, and a secure channel 206.

The thin client 104 may include a wrapper 204. The wrapper 204 may be a secure channel wrapper on the thin client 104. The wrapper 204 may be utilized to establish a secure channel with the remote computer 106 to protect communication confidentiality. In some embodiments, the wrapper 204 may be utilized to allow the thin client 104 to mimic a portable device of a second portable device type (e.g., the portable device 202) by protecting portable device data of a first portable device type using a security protocol associated with a second portable device type. In other embodiments, the remote computer 106 may initially determine that it is communicating with a portable device of a second portable device type when it is actually communicating with the portable device 202 via the thin client 104. It can determine that it is communicating with a portable device of the first portable device type, after any security protections afforded by the wrapper 204 are removed.

In some embodiments, the secure channel 206 may be established by the thin client 104 and the remote computer 106. The secure channel 206 may be established as a result of a secure channel protocol associated with a portable device of a second portable device type. The secure channel may utilize a public/private key pair associated with the thin client 104, and a public/private key pair associated with the remote computer 106. These key pairs may be generated on a per transaction basis. The secure channel may also use unpredictable numbers and random blinding factors.

Figure 3:
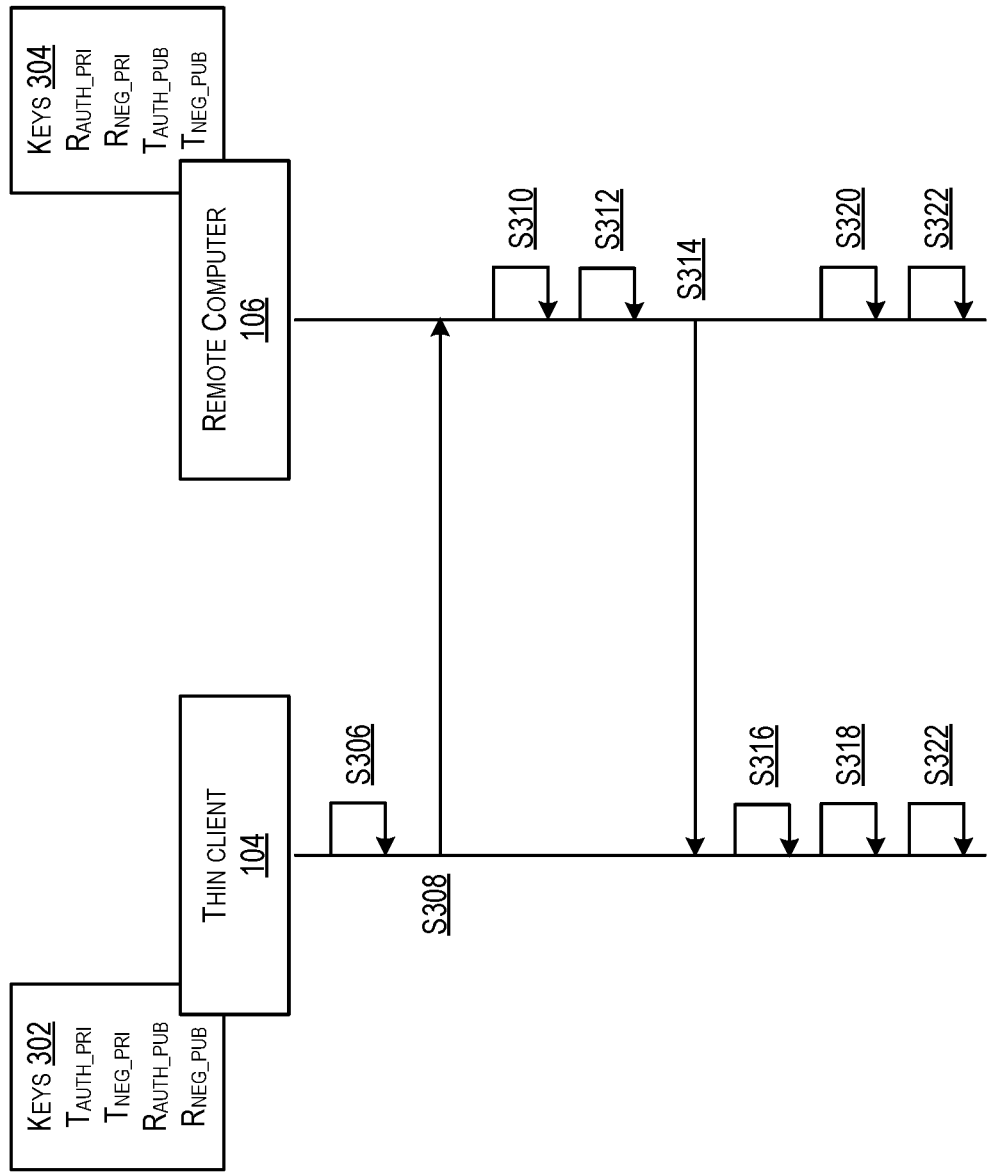
FIG. 3 shows a method for generating a shared secret to be utilized to establish a secure connection, according to at least one embodiment.

FIG. 3 shows a method 300 for generating a shared secret to be utilized to establish a secure connection, according to at least one embodiment. In situations like the one described in FIG. 2B, the thin client 104 and remote computer 106 may perform operations to establish a secure channel (e.g., the secure channel 206 of FIG. 2B). As part of this process, the thin client 104 and the remote computer 106 may perform the method 300 to establish a shared secret. Prior to conducting the method 300, the thin client 104 may be provisioned with an authentication key pair including a private key ($T_{AUTH\_PRI}$) and a public key ($T_{AUTH\_PUB}$) and a negotiation key pair including a private key ($T_{NEG\_PRI}$) and public key ($T_{NEG\_PUB}$). Similarly, the remote computer 106 may be provisioned with an authentication key pair including a private key ($R_{AUTH\_PRI}$) and a public key ($R_{AUTH\_PUB}$) and a negotiation key pair including a private key ($R_{NEG\_PRI}$) and public key ($R_{NEG\_PUB}$). Each may store its own private keys and the public keys of the other component through a separate process conducted prior to method 300. That is, the thin client 104 may store keys 302 (e.g., $T_{AUTH\_PRI}$, $T_{NEG\_PRI}$, $R_{AUTH\_PUB}$, and $R_{NEG\_PUB}$), while the remote computer 106 may store keys 304 (e.g., $R_{AUTH\_PRI}$, $R_{NEG\_PRI}$, $T_{AUTH\_PUB}$, and $T_{NEG\_PUB}$). In some embodiments, method 300 may be performed prior to establishing the secure channel 206 of FIG. 2B.

The method 300 may begin at S306, where the thin client 104 generates an ephemeral key pair including a private key ($TE_{RRI}$) and a public key ($TE_{PUB}$). The thin client 104 may then generate a random nonce ($nonce_{TC}$) of a predetermined length. In some embodiments, the nonce may be generated according to the standard WP-80056Ar3. The thin client 104 may concatenate $TE_{PUB}$ and $nonce_{TC}$ and digitally sign the concatenated value utilizing the thin client's private authentication key, $T_{AUTH\_PRI}$. The resultant digital signature may be referred to as $DS_{TC}$.

At S308, the thin client 104 may transmit the digital signature ($DS_{TC}$) generated at S306 to the remote computer 106.

At S310, the remote computer 106 may receive $DS_{TC}$ and verify the digital signature utilizing the public key of the thin client 104 (e.g., $T_{AUTH\_PUB}$). If the signature is verified, the method may proceed.

At S312, the remote computer 106 may generate another random nonce ($nonce_{RC}$). The remote computer may concatenated the received $nonce_{TC}$ with $nonce_{RC}$ (e.g., $nonce_{RC}||nonce_{TC}$) and digitally signs the concatenated value with the remote computer's authentication private key ($R_{AUTH\_PRI}$). The resultant digital signature may be referred to as $DS_{RC}$.

At S314, the remote computer 106 may transmit the digital signature ($DS_{RC}$) generated at S312 to the thin client 104.

At S316, the thin client 104 may receive $DS_{RC}$ and verify the digital signature utilizing the public key of the remote computer 106 (e.g., $R_{AUTH\_PUB}$).

At S318, the thin client 104 may generate a shared secret Z, where $Z=Z_S||Z_E$, where $Z_S$=Diffie-Hellman key exchange (DH)($T_{NEG\_PRI}$, $R_{NEG\_PUB}$) and $Z_E$=(DH)($TE_{PRI}$, $R_{NEG\_PUB}$). The DH primitive may be defined in section 5.7.1.1 of SP-80056Ar3.

At S320, the remote computer 106 may generate a shared secret Z, where $Z=Z_S||Z_E$, where $Z_S$=DH($R_{NEG\_PUB}$, $TE_{PUB}$) and $Z_E$=DH($R_{NEG\_PUB}$, $T_{NEG\_PUB}$). The DH primitive may be defined in section 5.7.1.1 of SP-80056Ar3.

As an alternative example, at S318, the thin client 104 may generate a shared secret Z, where $Z=Z_S \text{ II } Z_E$, where $Z_S$=ECC CDH ($T_{NEG\_PRI}$, $R_{NEG\_PUB}$) and $Z_E$=ECC CDH ($TE_{PRI}$, $R_{NEG\_PUB}$). The ECC CDH primitive may be defined in section 5.7.1.2 of SP-80056Ar3. At S320, the remote computer 106 may generate a shared secret Z, where $Z=Z_S||Z_E$, where $Z_S$=ECC CDH ($R_{NEG\_PUB}$, $TE_{PUB}$) and $Z_E$=ECC CDH ($R_{NEG\_PUB}$, $T_{NEG\_PUB}$).

As yet another alternative example, at S318, the thin client 104 may generate a shared secret Z, where Z=DH ($TE_{PRI}$, $R_{NEG\_PUB}$). At S320, the remote computer 106 may generate the shared secret Z, where Z=DH ($R_{NEG\_PRI}$, $TE_{PUB}$).

At S322, both the thin client 104 and the remote computer 106 may generate one or more session keys using the shared secret Z, the $nonce_{TC}$, the $nonce_{RC}$, or any suitable values.

Figure 4:
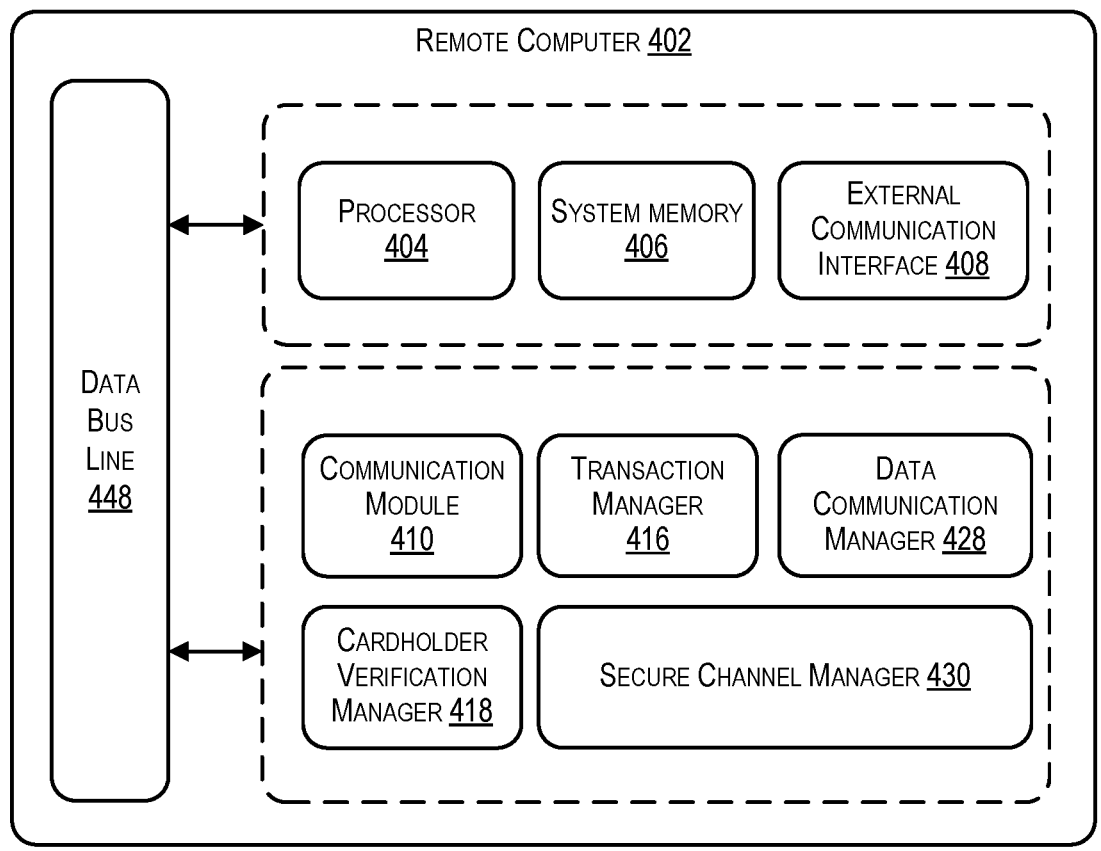
FIG. 4 illustrates a block diagram of a remote computer, in accordance with at least one embodiment.

FIG. 4 illustrates a block diagram of a remote computer 402, according to at least one embodiment. The remote computer 402 may be an example of the remote computers 106 of FIGS. 1-3. The remote computer 402 is illustrated as comprising a plurality of hardware and software modules (404-430). However, it should be appreciated that this is provided for illustration purposes only, and each of the modules and associated functionality may be provided and/or performed by the same or different components. That is, the remote computer 402 may perform some of the relevant functions and steps described herein with reference to the remote computer 106 of the above figures through the use of any suitable combination of software instructions and/or hardware configurations. It should be noted that although FIG. 4 illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s). In some cases, the software modules may be located on a virtual machine or a container.

The remote computer 402 may be a server computer (e.g., a server computer operating in a cloud computing environment). The remote computer 402 is shown as comprising a processor 404, system memory 406 (which may comprise any combination of volatile and/or non-volatile memory such as, for example, buffer memory, RAM, DRAM, ROM, flash, or any other suitable memory device), and an external communication interface 408. Moreover, one or more of the modules 410-430 may be disposed within one or more of the components of the system memory 406, or may be disposed externally. As was noted above, the software and hardware modules shown in FIG. 4 are provided for illustration purposes only, and the configurations are not intended to be limiting. The processor 404, system memory 406 and/or external communication interface 408 may be used in conjunction with any of the modules 410-430 described below to provide a desired functionality. Some exemplary modules and related functionality may be as follows:

A communication module 410 may be configured or programmed to perform some or all of the functionality associated with receiving, sending, and generating electronic messages for transmission at the remote computer 402 to or from any of the entities shown in FIGS. 1-3. When an electronic message is received by the remote computer 402 via the external communication interface 408, it may be passed to the communication module 410. The communication module 410 may identify and parse the relevant data based on a particular messaging protocol used in the remote computer 402 (e.g., EMV 2.0). The communication module 410 may then transmit any received information to an appropriate module within the remote computer 402 (e.g., via a data bus line 448). The communication module 410 may also receive information from one or more of the modules in the remote computer 402 and generate an electronic message in an appropriate data format in conformance with a transmission protocol used in the remote computer 402 so that the message may be sent to one or more entities within system (e.g., to the thin client 104). The electronic message may then be passed to the external communication interface 408 for transmission.

A data communication manager 428 may be programmed and/or configured to perform functionality associated with (1) preparing and managing a list of data objects requested by the transaction processing module and providing the requested data objects received from the portable device, and (2) managing and responding to the portable device's data objects requests by populating the message sent to the access device with corresponding data objects obtained from the transaction processing module 416.

In some embodiments, the transaction processing module 416 may inform the data communication manager 428 about its data request statuses. If transaction processing module 416 needs data from the portable device, the data communication manager list may include the corresponding data identifiers. Otherwise, the data communication manager list may be empty. Meanwhile, the portable device may inform the data communication manager 428 about its data requests status. If a portable device requests data from the remote computer 402, the portable device list may include the corresponding data identifiers. If the portable device has no immediate data request, the portable device list may be empty. Additionally, the portable device may provide data objects that the data communication manager requested.

The data communication manager 428 may synchronize the exchange of data between a portable device and the remote computer 402 in order to optimize performance and minimize the number of communications exchanged with the portable device. Additionally, the data communication manager 428 may cause the secure channel manager 430 to send secured communications to the thin client and/or the portable device. When a communication channel is established with the thin client or the portable device, the thin client, portable device, and/or the transaction processing module 416 may inform the data communication manager 428 of their security level preferences, hence directing the data communication manager 428 to interact accordingly with the secure channel manager 430.

The secure channel manager 430 may be programmed and/or configured to perform functionality associated with securing data exchanges with the thin client and/or the portable device in a way that is transparent to the data communication manager 428 and transaction processing module 416. In some embodiments, the secure channel manager 430 may negotiate a shared secret with the thin client and/or the portable device in order to establish a secure communications channel through which encrypted data may be sent. For example, the method 300 of FIG. 3 may be performed, at least in part, by the secure channel manager in order to negotiate a shared secret with the thin client. Accordingly, the secure channel manager 430 may be configured to receive and store authentication key pairs and/or negotiation key pairs associated with the remote computer 402. The secure channel manager 430 may further be configured to generate one or more ephemeral key pairs to be utilized in the negotiation. The secure channel manager 430 may be configured to establish a secure channel utilizing the shared secret generated. Once the secure channel is established, the secure channel manager may be configured to encrypt data prior to transmitting the encrypted data to the thin client and/or the portable device and decrypt data received via the secure channel prior to forwarding the decrypted data to any suitable component of the remote computer 402 for further processing.

Figure 5:
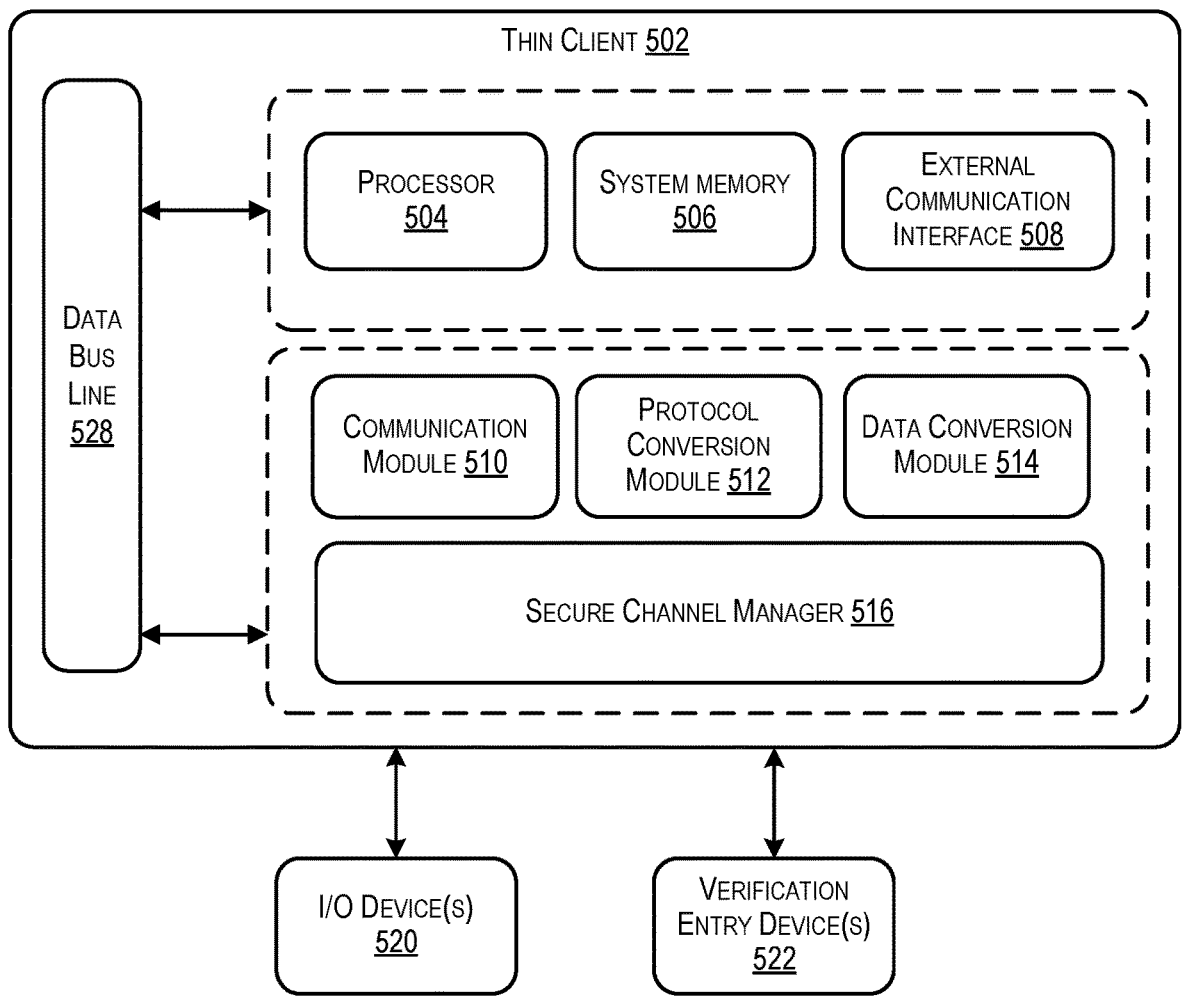
FIG. 5 illustrates a block diagram of a thin client, in accordance with at least one embodiment.

FIG. 5 illustrates a block diagram of the thin client 502, according to at least one embodiments. The thin client 502 (an example of the thin clients 104 of FIGS. 1-3) is illustrated as comprising a plurality of hardware and software modules (504-516). However, it should be appreciated that this is provided for illustration purposes only, and each of the modules and associated functionality may be provided and/or performed by the same or different components. That is, the thin client 502 may, for instance, perform some of the relevant functions and steps described herein through the use of any suitable combination of software instructions and/or hardware configurations.

The thin client 502 is shown as comprising a processor 504, system memory 506, and an external communication interface 508. Moreover, one or more of the modules 510-516 may be disposed within one or more of the components of the system memory 506, or may be disposed externally. The processor 504, system memory 506 and/or external communication interface 508 may be used in conjunction with any of the modules described below to provide a desired functionality. Some exemplary modules and related functionality may be as follows.

A communication module 510 may be configured or programmed to perform some or all of the functionality associated with receiving, sending, and generating electronic messages for transmission at the thin client 502 to or from any of the entities shown in the figures above. When an electronic message is received by the thin client 502 via the external communication interface 508, it may be passed to the communication module 510. The communication module 510 may identify and parse the relevant data based on a particular messaging protocol used to communication the data (e.g., EMV 1.0, EMV 2.0, etc.). The communication module 510 may then transmit any received information to an appropriate module within the thin client 502 (e.g., via a data bus line 528). The communication module 510 may also receive information from one or more of the modules in the thin client 502 and generate an electronic message in an appropriate data format in conformance with a transmission protocol used by the intended recipient such that the message may be sent to one or more entities (e.g., to the remote computer 106, the portable device 102 of FIG. 1). The electronic message may then be passed to the external communication interface 508 for transmission.

A communication module 510 may be configured or programmed to perform some or all of the functionality associated with communicating with portable devices. In particular, the communication module 510 may be responsible for (1) establishing, maintaining, and terminating a session with a portable device, (2) allowing the exchange of messages within a given session, (3) and allowing multiple sessions to coexist.

The protocol conversion module 512 may be configured to perform some or all of the functionality associated with converting communications sent between a portable device and a remote computer from one communication protocol (e.g., a first communication protocol) to another (e.g., a second communication protocol). The protocol conversion module 512 may be responsible for determining what communication protocol (e.g., EMV 1.0 or EMV 2.0) a particular device is configured to use. Based on this determination, the protocol conversion module 512 may handle the conversion of communications exchanged for a transaction if requested. For example, a communication originating from a portable device may be received by the communication module 510. Based on a determination that the portable device uses the second communication protocol while the remote computer uses the first communication protocol, the protocol conversion module may convert the communication from the second communication protocol to the first communication protocol before forwarding the converted communication to the remote computer (e.g., via a secured channel).

In particular, the protocol conversion module 512 may be responsible for (1) requesting the communication module 510 to establish, maintain, and terminate a session with a portable device, and (2) synchronizing the exchange of messages between the portable device and the remote computer in order to optimize performance and minimize the number of communications exchanged with the remote computer.

In order to do so, the protocol conversion module 512 may be configured or programmed to (1) create, format, and exchange as many messages as necessary within a given session, to fulfill as many as possible data requests from the remote computer and (2) create, format, and exchange as many messages as necessary within a given session, to fulfill as many as possible data requests from the portable device.

The data conversion module 514 may be configured or programmed to perform some or all of the functionality associated with converting data sent between portable devices and the remote computer from one data format (e.g., associated with the first communication protocol) to another (e.g., the format associated with the second communication protocol). The data conversion module 514 may be responsible for determining what communication protocol (e.g., EMV 1.0 or EMV 2.0) a particular portable device is configured to use. Based on this determination, the data conversion module 514 may handle the conversion of data to the communication protocol of the recipient device. For example, a communication originating from the portable device may be received by the communication module 510. Based on a determination that the portable device uses the second communication protocol while the remote computer uses the first communication protocol, the data conversion module 514 may convert the data format associated with the second communication protocol to the format appropriate for the first communication protocol before forwarding the converted data to the remote computer (e.g., via a secured channel).

The secure channel manager 516 may be programmed and/or configured to perform functionality associated with securing data exchanges with a remote computer and/or a portable device in a way that is transparent to the modules of the thin client 502. In some embodiments, the secure channel manager 516 may negotiate a shared secret with remote computer 106 in order to establish a secure communications channel through which encrypted data may be sent. For example, the method 300 of FIG. 3 may be performed, at least in part, by the secure channel manager 516 in order to negotiate a shared secret with the remote computer. Accordingly, the secure channel manager 516 may be configured to receive and store authentication key pairs and/or negotiation key pairs associated with the thin client 502. The secure channel manager 516 may further be configured to generate one or more ephemeral key pairs to be utilized in the negotiation. The secure channel manager 516 may be configured to establish a secure channel utilizing the shared secret generated. Once the secure channel is established, the secure channel manager may be configured to encrypt data prior to transmitting the encrypted data to the remote computer 106 and decrypt data received via the secure channel prior to forwarding the decrypted data to any suitable component of the thin client 502 for further processing.

In some embodiments, thin client 502 may be communicatively coupled to one or more I/O device(s) 520 or the I/O device(s) 520 may operate locally at the thin client 502 as a component of the thin client 502. The I/O devices(s) 520 may include, but are not limited to, displays, keypads, keyboards, touch screens, biometric readers, card readers, or the like. In some embodiments, any suitable component of the thin client 502 may cause the processor 504 to present and/or collect data at the I/O device(s) 520.

Similarly, thin client 502 may be communicatively coupled to one or more verification entry device(s) 522 or the verification entry device(s) 522 may operate locally at the thin client 502 as a component of the thin client 502. The verification entry device(s) 522 may include, but are not limited to, displays, keypads, keyboards, touch screens, biometric readers, or the like. In some embodiments, any suitable module of the thin client 502 may be configured to cause the processor 504 to collect data utilizing the verification entry device(s) 522. For example, as part of a transaction, a user may be prompted to provide a signature and/or a PIN or password. Accordingly, the processor 704 may provide information to the verification entry device(s) 722 to effectuate the collection of such data.

Figure 6:
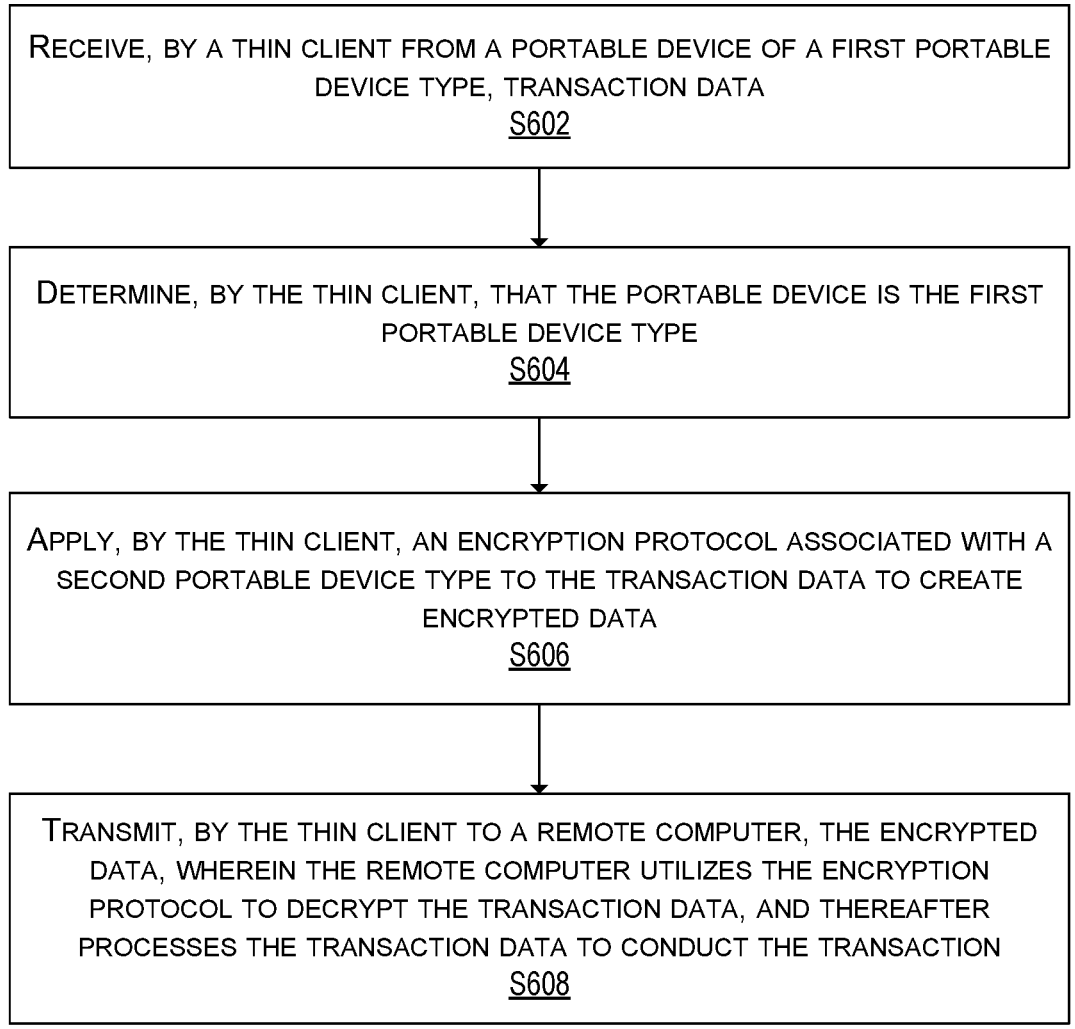
FIG. 6 shows a flowchart of a method for performing a transaction according to some embodiments.
Figure 6:

FIG. 6 shows a flowchart of a method 600 for conducting a transaction according to some embodiments. The method may be performed by a thin client in any suitable order. More or fewer steps may be included in the method 600.

The method 600 may begin at 602, where a thin client (e.g., thin client 104 of FIG. 2B) may receive data (e.g., transaction data) from a portable device of the first portable device type (e.g., portable device 202 of FIG. 2B). In some embodiments, the thin client 104 may receive data when the thin client 104 and the portable device come into communication or otherwise interact.

At 604, the thin client (e.g., thin client 104) may determine that the portable device is of the first portable device type. In some embodiments, the determination may be based on the format or contents of the transaction data.

At 606, after determining that the portable device is of the first portable device type, the thin client may apply an encryption protocol associated with the second portable device type to the access data to create encrypted data. In some embodiments, applying the encryption protocol may include generating a shared secret with a remote computer (e.g., remote computer 106 of FIG. 2B), establishing a secure channel with the remote computer, encrypting the transaction data utilizing the shared secret, or any suitable combination of the above.

At 608, the thin client 104 may transmit the encrypted data to the remote computer 106. In some embodiments, the thin client 104 may transmit the encrypted data using a secure channel (e.g., the secure channel 206 of FIG. 2B) generated through applying the encryption protocol discussed at 606. After receiving the encrypted data, the remote computer (e.g., the remote computer 106 of FIG. 2B) may utilize the encryption protocol to decrypt the encrypted data to retrieve the transaction data. The remote computer may process the access data. In some embodiments, the remote computer may generate a response and transmit the response to the thin client using the secure channel.

Therefore, according to some embodiments, the thin client 104 may first establish the secure channel 206 with the remote computer 106. The thin client 104 may communicate with the portable device 202 unprotected. The thin client 104 may then transmit transaction data from the portable device 202 as encrypted data via the secure channel. After receiving a response from the remote computer 106 using the secure channel, the thin client 104 may decrypt the response and provide the response to the portable device 202.

Figure 7:
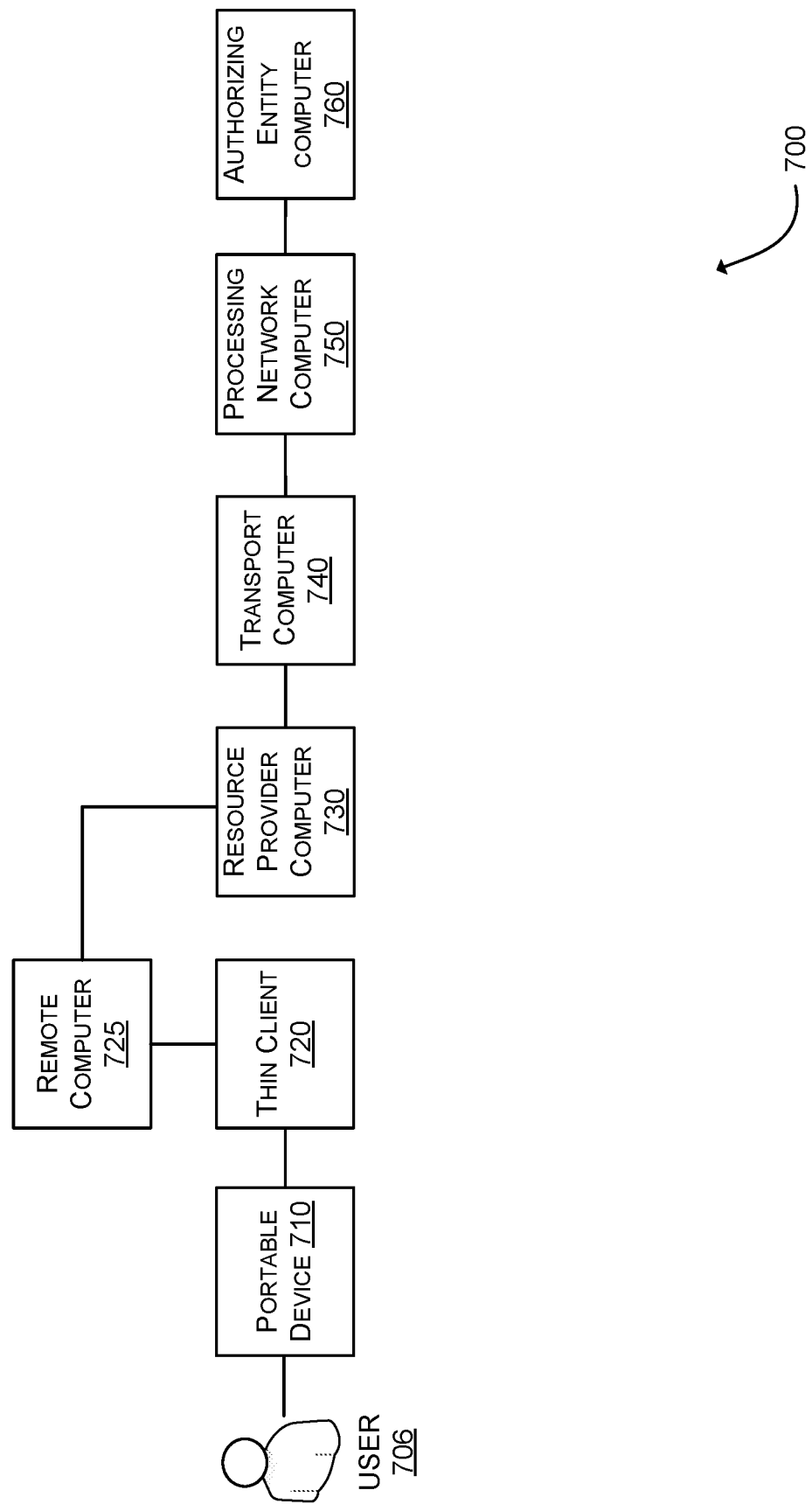
FIG. 7 shows a block diagram illustrating a transaction processing system.

FIG. 7 shows a block diagram of a transaction processing system 700. FIG. 7 shows a user 706 that can operate a portable device 710 (e.g., an example of the portable device 202 of the figures above). The user 706 may use the portable device 710 to pay for a good or service, such as a ticket, at a resource provider (e.g., a merchant). In some embodiments, the portable device 710 is a credit card or debit card issued by the authorizing entity. The resource provider may operate a resource provider computer 730 and/or a thin client 720 (a type of access device). The resource provider computer 730 may be configured to communicate with an authorizing entity computer 760 operated by, or on behalf of, an authorizing entity, via a transport computer 740 (operated by an acquirer) and a processing network computer 750 operating as part of a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction can be described as follows, the user 706 will insert the portable device 710 into an interface of the thin client 720 (e.g., a card reader). In some embodiments, the portable device 710 may be held near the thin client 720. The thin client 720 may be configured to facilitate communications between the remote computer 725 and the portable device 710. The remote computer 725 is intended to be an example of the remote computer 106 of the above figures. In some embodiments, the remote computer 725 is configured to perform POS functionality. The thin client 720 may facilitate data exchange between the remote computer 725 and the portable device 710 in any suitable manner and as described in the above figures. Once POS data and payment data (or any suitable data) are exchanged between the remote computer 725 and the portable device 710, the remote computer 725 may be configured to initiate a transaction via the resource provider computer 730.

The resource provider computer 730 may receive this information from the thin client 720 via an external communication interface. The resource provider computer 730 may then generate an authorization request message that includes at least a portion of the information received from the thin client 720 and electronically transmits this message to a transport computer 740. The transport computer 740 may then receive, process, and forward the authorization request message to a processing network computer 750 for authorization.

In general, prior to the occurrence of a credit or debit-card transaction, the processing network computer 750 has an established protocol with each issuer on how the issuer's transactions are to be authorized. In some cases, such as when the transaction amount is below a threshold value, the processing network computer 750 may be configured to authorize the transaction based on information that it has about the user's account without generating and transmitting an authorization request message to the authorizing entity computer 760. In other cases, such as when the transaction amount is above a threshold value, the processing network computer 750 may receive the authorization request message, determine the issuer associated with the portable device 710, and forward the authorization request message for the transaction to the authorizing entity computer 760 for verification and authorization. Once the transaction is authorized, the authorizing entity computer 760 may generate an authorization response message (that may include an authorization code indicating the transaction is approved or declined) and transmit this electronic message via its external communication interface to processing network computer 750. The processing network computer 750 may then forward the authorization response message to the transport computer 740, which in turn may then transmit the electronic message to comprising the authorization indication to the resource provider computer 730, and then to the thin client 720.

At the end of the day or at some other suitable time interval, a clearing and settlement process between the resource provider computer 730, the transport computer 740, the processing network computer 750, and/or the authorizing entity computer 760 may be performed on the transaction.

FIG. 8 shows a block diagram of a building access system 800. FIG. 8 shows a portable device 810 (e.g., the portable device 102 of FIGS. 1-3) operated by a user 806. The portable device 810 can interact with the thin client 820 to exchange data with the remote computer 825 (e.g., a device that manages access to the building 830).

An access transaction can be described as follows, the user 806 will insert the portable device 810 into an interface of the thin client 820 (e.g., a card reader). In some embodiments, the portable device 810 may be held near the thin client 820. The thin client 820 may perform any suitable conversion to convert (if necessary) the data and/or messages received from the portable device 810 to data and/or messages corresponding to a communications protocol utilized by the remote computer 825 (EMV 2.0). The thin client 820 and the remote computer 825 may method 300 of FIG. 3 to generate a shared secret with which a secure channel may be established between the thin client 820 and the remote computer 825. The thin client 820, utilizing the secure channel, may facilitate a data exchange between the portable device 810 and the remote computer 825. Accordingly, any data being transmitted from the thin client 820 to the remote computer 825 may be encrypted and transmitted via the secure channel where the remote computer 925 may decrypt the data before further processing. Similarly, any data being transmitted from the remote computer 825 to the thin client 820 may be encrypted (e.g., utilizing the shared secret) and transmitted via the secure channel to the thin client 820 which may then decrypt the data prior to further processing. The remote computer 825 may be configured to verify the user 806 according to the data provided by the portable device 810 via the thin client 820.

If the remote computer 825 is able to verify the user 806 utilizing the data provided by the portable device 810 (via the thin client 820) and previously stored credentials (e.g., the data provided by the portable device 810 matches previously stored credentials associated with the user 806), the remote computer 825 may be configured to allow the user 806 access to the building 830 (or any suitable secure location/resource managed by the remote computer 825). If the user 806 is not verified (e.g., the data provided by the portable device 810 does not match the previously stored credentials associated with the user 806), the remote computer 825 may be configured to deny the user 806 access to the building 830 (or any suitable secure location/resource managed by the remote computer 825).

Technical Improvements

Embodiments of the invention provide for a number of advantages. For example, portable devices operating with an older protocol (e.g., EMV 1.0) were previously incapable of utilizing the security features provided in newer protocols (e.g., EMV 2.0). By utilizing a thin client that is configured to apply these security features (e.g., generate a shared secret with a remote computer, establish a secure channel with the remote computer) the security of the data exchanged between the portable device and the remote computer via a thin client is improved.

Further details that can support embodiments of the invention can be found in U.S. patent application Ser. No. 15/631,716, filed on Jun. 23, 2017, which is herein incorporated by reference it its entirety for all purposes.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A computer-implemented method for conducting a transaction, comprising:
   receiving, by a thin client from a portable device of a first portable device type, transaction data, the thin client being configured to facilitate data exchange between the portable device and a remote computer;
   determining, by the thin client, that the portable device is the first portable device type;
   establishing a secure channel between the thin client and the remote computer, the secure channel being established based at least in part on transmitting, to the remote computer, an ephemeral public key generated by the thin client, the ephemeral public key being digitally signed with an authentication private key associated with the thin client:
   applying, by the thin client, an encryption protocol associated with a second portable device type to the transaction data to create encrypted data; and
   transmitting, by the thin client to the remote computer over the secure channel, the encrypted data, wherein the remote computer utilizes the encryption protocol to decrypt the transaction data, and thereafter processes the transaction data to conduct the transaction.

2. The computer-implemented method of claim 1, wherein the encryption protocol is applied based at least in part on determining that the portable device is the first portable device type.

3. The computer-implemented method of claim 1, wherein the transaction data is received from the remote computer.

4. The computer-implemented method of claim 1, wherein the thin client is operated by a resource provider.

5. The computer-implemented method of claim 1, wherein the remote computer provides access device transaction functionality as a service.

6. The computer-implemented method of claim 1, wherein establishing the secure channel further comprises:
   generating, by the thin client, an ephemeral key pair comprising an ephemeral private key and the ephemeral public key;
   generating, by the thin client, a random value;
   generating, by the thin client, a concatenated value comprising the ephemeral public key and the random value;
   digitally signing, by the thin client, the concatenated value with an authentication private key associated with the thin client; and
   transmitting, by the thin client to the remote computer, the concatenated value as digitally signed.

7. The computer-implemented method of claim 1, further comprising:
   receiving, by the thin client from the remote computer, subsequent encrypted data, wherein the thin client is configured to decrypt the subsequent encrypted data utilizing the encryption protocol; and
   verifying, by the thin client, the subsequent encrypted data is unaltered and was transmitted by the remote computer.

8. The computer-implemented method of claim 1, further comprising:
   generating, by the thin client, a secure communications wrapper, wherein the encrypted data is generated utilizing the transaction data and the secure communications wrapper.

9. The computer-implemented method of claim 1, wherein the encryption protocol is unknown to portable devices of the first portable device type.

10. A thin client comprising:
    a processor; and
    a computer readable medium coupled to the processor, the computer readable medium comprising code that, when executed by the processor, causes the thin client to:
        receive, from a portable device of a first portable device type, transaction data associated with conducting a transaction, the thin client being configured to facilitate data exchange between the portable device and a remote computer;
        determine that the portable device is the first portable device type;
        establish a secure channel between the thin client and the remote computer, the secure channel being established based at least in part on transmitting, to the remote computer, an ephemeral public key generated by the thin client, the ephemeral public key being digitally signed with an authentication private key associated with the thin client;
        apply an encryption protocol associated with a second portable device type to the transaction data to create encrypted data; and
        transmit, to the remote computer over the secure channel, the encrypted data, wherein the remote computer utilizes the encryption protocol to decrypt the transaction data, and thereafter processes the transaction data to perform the transaction.

11. The thin client of claim 10, wherein the encryption protocol is applied based at least in part on determining that the portable device is the first portable device type.

12. The thin client of claim 10, wherein the transaction data is received from the remote computer.

13. The thin client of claim 10, wherein the thin client is operated by a resource provider.

14. The thin client of claim 10, wherein the remote computer provides access device transaction functionality as a service.

15. The thin client of claim 10, wherein establishing the secure channel further causes the thin client to:
    generate an ephemeral key pair comprising an ephemeral private key and the ephemeral public key;
    generate a random value;
    generate a concatenated value comprising the ephemeral public key and the random value;
    digitally sign the concatenated value with an authentication private key associated with the thin client; and
    transmit, to the remote computer, the concatenated value as digitally signed.

16. The thin client of claim 10, wherein executing the code further causes the thin client to:
    receive, from the remote computer, subsequent encrypted data, wherein the thin client is configured to decrypt the subsequent encrypted data utilizing the encryption protocol; and
    verify the subsequent encrypted data is unaltered and was transmitted by the remote computer.

17. The thin client of claim 10, wherein executing the code further causes the thin client to generate a secure communications wrapper, wherein the encrypted data is generated utilizing the transaction data and the secure communications wrapper.

18. The thin client of claim 10, wherein the encryption protocol is unknown to portable devices of the first portable device type.

\* \* \* \* \*